(12) United States Patent
Deng et al.

(10) Patent No.: US 12,147,139 B2
(45) Date of Patent: Nov. 19, 2024

(54) DISPLAY DEVICE HAVING WIDE VIEWING ANGLE IN SHARING MODE

(71) Applicant: WUHAN CHINA STAR OPTOELECTRONICS TECHNOLOGY CO., LTD., Hubei (CN)

(72) Inventors: Qian Deng, Hubei (CN); Wei Cheng, Hubei (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 388 days.

(21) Appl. No.: 17/623,496

(22) PCT Filed: Dec. 20, 2021

(86) PCT No.: PCT/CN2021/139780
§ 371 (c)(1),
(2) Date: Dec. 28, 2021

(87) PCT Pub. No.: WO2023/108689
PCT Pub. Date: Jun. 22, 2023

(65) Prior Publication Data
US 2023/0185145 A1    Jun. 15, 2023

(30) Foreign Application Priority Data
Dec. 14, 2021    (CN) .......................... 202111526063.7

(51) Int. Cl.
*G02F 1/137* (2006.01)
*G02F 1/13* (2006.01)
(Continued)

(52) U.S. Cl.
CPC ............ *G02F 1/137* (2013.01); *G02F 1/1323* (2013.01); *G02F 1/134309* (2013.01);
(Continued)

(58) Field of Classification Search
CPC ............ G02F 1/133504; G02F 1/1323; G02F 1/133753; G02B 5/1871
See application file for complete search history.

(56) References Cited

U.S. PATENT DOCUMENTS 10,627,663 B2 *   4/2020   Wang ................... G02B 5/1871
2006/0007302 A1   1/2006   Numata et al.
(Continued)

FOREIGN PATENT DOCUMENTS

CN   104849924 A   8/2015
CN   105589228 A   5/2016
(Continued)

OTHER PUBLICATIONS

International Search Report in International application No. PCT/CN2021/139780, mailed on Sep. 14, 2022.
(Continued)

*Primary Examiner* — Joseph L Williams
(74) *Attorney, Agent, or Firm* — PV IP PC; Wei Te Chung (57) ABSTRACT

The present application provides a display device, when the display device is in a first display mode, a transmittance of first optical units to light is less than a transmittance of second optical units to light, so that diffracted light is emitted due to a phenomenon that apertures in a diffraction panel are alternating between light and dark. After the diffracted light emitted by the diffraction panel passes through a display panel, the display device has a wide viewing angle in the first display mode.

17 Claims, 7 Drawing Sheets

(51) Int. Cl.
*G02F 1/1343* (2006.01)
*G02F 1/1335* (2006.01)

(52) U.S. Cl.
CPC .... *G02F 1/133553* (2013.01); *G02F 2203/22* (2013.01); *G02F 2203/48* (2013.01)

(56) References Cited

U.S. PATENT DOCUMENTS

| | | |
|---|---|---|
| 2006/0145976 A1 | 7/2006 | Tsai et al. |
| 2021/0018778 A1 | 1/2021 | Matsushima |

FOREIGN PATENT DOCUMENTS

| | | |
|---|---|---|
| CN | 106054415 A | 10/2016 |
| CN | 106707578 A | 5/2017 |
| CN | 108919546 A | 11/2018 |
| CN | 109188769 A | 1/2019 |
| CN | 212905828 U | 4/2021 |
| CN | 112987388 A | 6/2021 |
| CN | 113138491 A | 7/2021 |
| JP | 2007264320 A | 10/2007 |
| JP | 2007264321 A | 10/2007 |
| JP | 2010032907 A | 2/2010 |
| KR | 20070003181 A | 1/2007 |
| KR | 20200066843 A | 6/2020 |
| WO | 2021020854 A1 | 2/2021 |

OTHER PUBLICATIONS

Written Opinion of the International Search Authority in International application No. PCT/CN2021/139780, mailed on Sep. 14, 2022.

Chinese Office Action issued in corresponding Chinese Patent Application No. 202111526063.7 dated May 9, 2022, pp. 1-7.

Notification to Grant Patent Right for Invention issued in corresponding Chinese Patent Application No. 202111526063.7 dated Aug. 31, 2022, pp. 1-4.

* cited by examiner

DISPLAY DEVICE HAVING WIDE VIEWING ANGLE IN SHARING MODE

CROSS-REFERENCE TO RELATED APPLICATIONS

This application is a 371 U.S. National Phase of International Application No. PCT/CN2021/139780, filed Dec. 20, 2021, which claims priority to Chinese Patent Application No. 202111526063.7, filed Dec. 14, 2021. The entire disclosures of the above applications are incorporated herein by reference.

BACKGROUND OF DISCLOSURE

Field of Disclosure

The present disclosure relates to a field of display technology, and in particular to a display device.

Description of Prior Art

With advances in technology and iterations of consumer electronics, there is an increasing need for a display device capable of freely switching between a peep-proof mode and a sharing mode. Wherein, in the peep-proof mode, a display device provides content readability within a viewing angle range and reduces content visibility away from a normal direction of a display surface. In the sharing mode, the content visibility away from the normal direction of the display surface is increased.

At present, how to increase the content visibility of the display device away from the normal direction of the display surface to achieve a good sharing effect is a technical problem to be solved.

SUMMARY OF DISCLOSURE

An object of the present disclosure is to provide a display device having wide viewing angles in a first display mode.

A display device, wherein the display device comprises a diffraction panel and a display panel, wherein the diffraction panel is located on a light incident side of the display panel, and the diffraction panel comprises:
  a first substrate;
  a second substrate disposed opposite to the first substrate;
  a plurality of first optical units disposed between the first substrate and the second substrate; and
  a plurality of second optical units disposed between the first substrate and the second substrate and disposed alternately with the plurality of first optical units in a direction perpendicular to a thickness direction of the diffraction panel;
  wherein a transmittance of the first optical units to light is less than a transmittance of the second optical units to light when the display device is in a first display mode.

The present disclosure provides a display device, the display device comprises a diffraction panel, and a display panel, the diffraction panel is located on a light incident side of the display panel, and the diffraction panel comprises first light units and second light units alternatively disposed in a direction perpendicular to the thickness direction of the diffraction panel. When the display device is in the first display mode, the transmittance of the first optical units to light is less than the transmittance of the second optical units to light, so that diffracted light is emitted due to a phenomenon that apertures in the diffraction panel are alternating between light and dark. After the diffracted light emitted by the diffraction panel passes through the display panel, the display device has a wide viewing angle in the first display mode.

DETAILED DESCRIPTION OF EMBODIMENTS

The following describes technical solutions of embodiments of the present disclosure clearly and completely with reference to the accompanying drawings in the embodiments of the present disclosure. It will be apparent that the described embodiments are only some but not all of the embodiments of the present disclosure. Based on the embodiments of the present disclosure, all other embodiments obtained by those skilled in the art without creative effort fall within the scope of the present disclosure.

Figure 1:
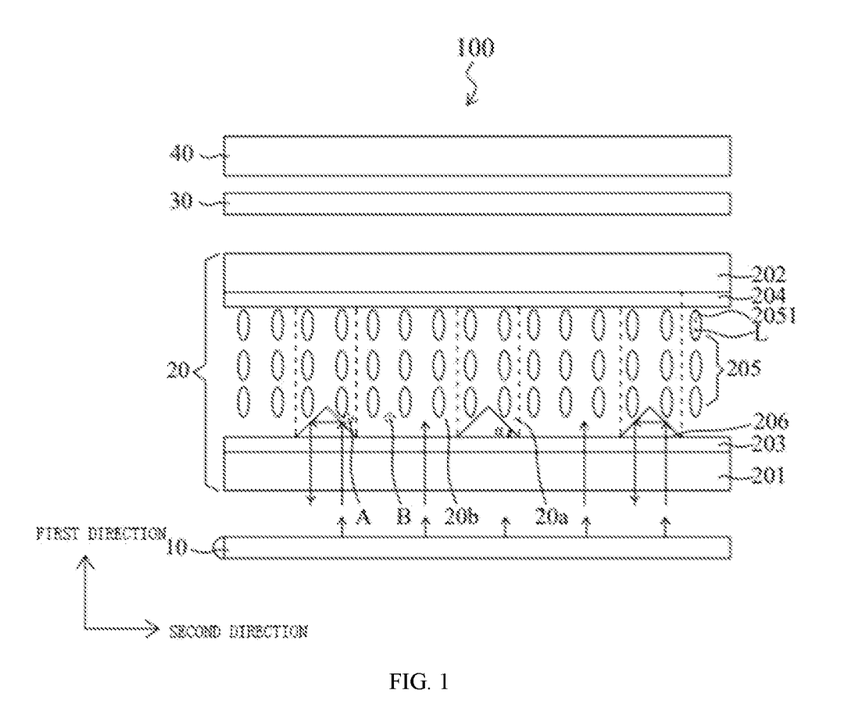
FIG. 1 is a schematic diagram of a display device in a first display mode according to a first embodiment of the present disclosure.
Figure 2:
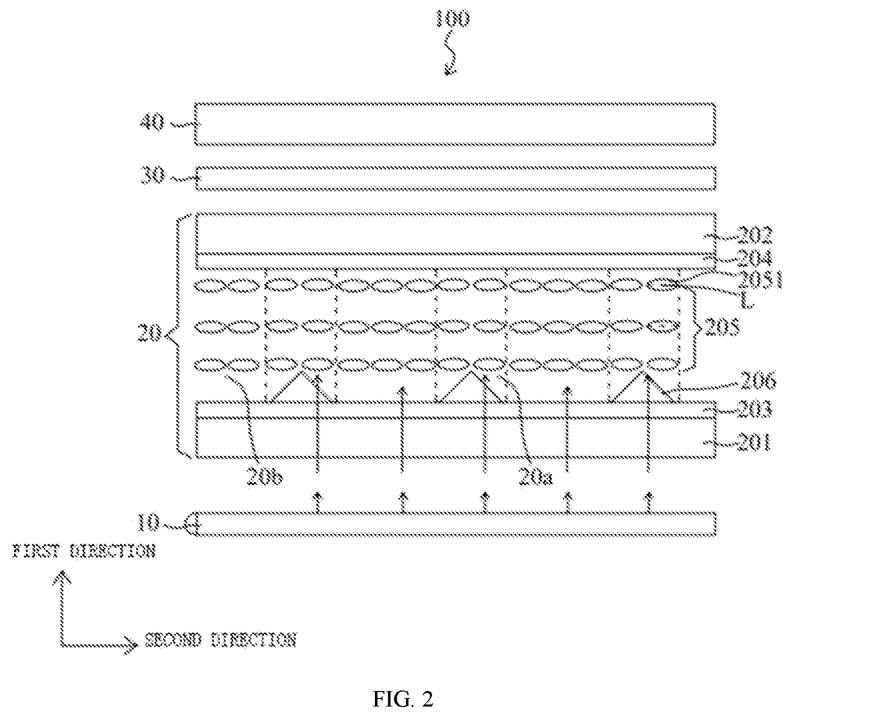
FIG. 2 is a schematic diagram of a display device in a second display mode according to a first embodiment of the present disclosure.

Referring to FIGS. 1 and 2, FIG. 1 is a schematic diagram of a display device in a first display mode according to a first embodiment of the present disclosure, and FIG. 2 is a schematic diagram of a display device in a second display mode according to a first embodiment of the present disclosure. A display device 100 has a first display mode and a second display mode, a visual viewing angle of the display device 100 in the second display mode is less than a visual viewing angle of the display device 100 in the first display mode, the display device 100 in the first display mode is in a sharing mode corresponding to a wide viewing angle, and the display device 100 in the second display mode is in a peep-proof mode corresponding to a narrow viewing angle. The display device 100 is free to switch between the first display mode and the second display mode, thereby realizing free switching between the peep-proof mode and the sharing mode. The display device 100 is a liquid crystal display device. The display device 100 may be applied to a mobile device such as a mobile phone or a tablet computer, or may be applied to a notebook computer screen, a desktop display, a television, a vehicle-mounted display screen, or the like.

The display device 100 comprises a backlight module 10, a diffraction panel 20, a dimming panel 30, and a display panel 40. The diffraction panel 20 is disposed between the backlight module 10 and the dimming panel 30. The dimming panel 30 is disposed between the diffraction panel 20 and the display panel 40. That is, the backlight module 10 is located at a light incident side of the diffraction panel 20, the dimming panel 30 is located at a light extraction side of the diffraction panel 20, and the dimming panel 30 and the diffraction panel 20 are both located at a light incident side of the display panel 40.

In this embodiment, the backlight module 10 is configured to provide collimated backlight. The backlight module 10 comprises light emitting elements that emit light of different colors corresponding to different wavelengths, so that the collimated backlight includes backlight of different wavelengths.

In this embodiment, the diffraction panel 20 comprises a first substrate 201, a second substrate 202, a first electrode layer 203, a second electrode layer 204, a liquid crystal layer 205, and a plurality of optical elements 206. The first substrate 201 is disposed opposite to the second substrate 202, the first electrode layer 203 is disposed on a surface of the first substrate 201 close to the second substrate 202, the second electrode layer 204 is disposed on a surface of the second substrate 202 close to the first substrate 201, the liquid crystal layer 205 is filled between the first substrate 201 and the second substrate 202, and the liquid crystal layer 205 is disposed between the first electrode layer 203 and the second electrode layer 204.

In this embodiment, both the first substrate 201 and the second substrate 202 are glass substrates.

In this embodiment, the liquid crystal layer 205 comprises a plurality of liquid crystal molecules 2051 each having a long axis L and a short axis perpendicular to the long axis L. A refractive index of the liquid crystal molecules 2051 in a long axis L direction is n1, and a refractive index of the liquid crystal molecules 2051 in a short axis direction is n3.

Specifically, a plurality of liquid crystal molecules 2051 are positive liquid crystals, and the refractive index n1 of the long axis L of the liquid crystal molecules 2051 to light is greater than the refractive index n3 of the short axis of the liquid crystal molecules 2051 to light. The refractive index n1 of the plurality of liquid crystal molecules 2051 in the long axis L direction is 1.55-1.75, for example, 1.6, 1.65, or 1.75. The refractive index n3 of the plurality of liquid crystal molecules 2051 in the short axis direction is 1.4-1.55, for example, 1.45, 1.5, or 1.55. It is understood that the plurality of liquid crystal molecules 2051 may be negative liquid crystals.

In this embodiment, the first electrode layer 203 and the second electrode layer 204 are configured to apply a voltage to the liquid crystal layer 205 so that the long axis L of the plurality of liquid crystal molecules 2051 is switched between being disposed in a first direction and being disposed in a second direction, which is different from the first direction. Both the first electrode layer 203 and the second electrode layer 204 are transparent conductive electrodes.

Specifically, when a voltage difference between the first electrode layer 203 and the second electrode layer 204 is less than a preset threshold value, the long axis L of the plurality of liquid crystal molecules 2051 of the liquid crystal layer 205 is disposed in the first direction, which is a thickness direction of the diffraction panel 20. When the voltage difference between the first electrode layer 203 and the second electrode layer 204 is greater than or equal to the preset threshold value, the long axis L of the plurality of liquid crystal molecules 2051 is deflected by the voltage difference from being disposed in the first direction to being disposed in the second direction perpendicular to the thickness direction of the diffraction panel 20. For example, when the voltage difference between the first electrode layer 203 and the second electrode layer 204 is zero, the long axis L of the plurality of liquid crystal molecules 2051 of the liquid crystal layer 205 is disposed in the first direction.

It should be noted that, the diffraction panel 20 further comprises a first alignment layer (not shown) disposed on a surface of the first electrode layer 203 close to the second substrate 202 and a second alignment layer (not shown) disposed on a surface of the second electrode layer 204 close to the first substrate 201. A pre-tilt angle of the plurality of liquid crystal molecules 2051 on the first alignment layer and the second alignment layer is equal to a included angle between the first direction and the direction perpendicular to the thickness direction of the diffraction panel 20, that is, the plurality of liquid crystal molecules 2051 are disposed in the first direction after the plurality of liquid crystal molecules 2051 are aligned, and the plurality of liquid crystal molecules 2051 are disposed in the first direction as an initial state of the plurality of liquid crystal molecules 2051.

In this embodiment, the plurality of optical elements 206 are disposed between the first substrate 201 and the second substrate 202 at intervals in the direction perpendicular to the thickness direction of the diffraction panel 201, and the plurality of optical elements 206 are disposed between the first electrode layer 203 and the second electrode layer 204. Any two adjacent optical elements 206 have a gap therebetween, and a portion of the liquid crystal layer 205 is filled in the gap therebetween. Wherein the plurality of optical elements 206 are transparent, and a preparation material of the plurality of optical elements 206 is a high transmittance material. A refractive index of the plurality of optical elements 206 is n2, and n2 is a fixed value, and the refractive index of the plurality of optical elements 206 is greater than one and less than or equal to two. The plurality of optical elements 206 may be prepared by exposing and developing a transparent organic film layer, and the plurality of optical elements 206 may be obtained by printing, micro-imprinting, or nanoimprinting.

Specifically, the plurality of optical elements 206 are disposed on the first substrate 201 at equal intervals, and the first substrate 201 is located on a side of the second substrate 202 away from the display panel 40.

In this embodiment, the plurality of optical elements 206 and a plurality of liquid crystal molecules 2051 provided corresponding to the plurality of optical elements 206 in the thickness direction of the diffraction panel 20 constitute first optical units 20a, that is, a plurality of liquid crystal molecules 2051 filled between the optical elements 206 and the second electrode layer 204 in the thickness direction of the diffraction panel 206 and the optical elements 206 constitute the first optical units 20a. A plurality of liquid crystal molecules 2051 in a region adjacent to the first optical units 20a and in which the optical element 206 is not disposed constitute the second optical units 20b. Each of the first optical units 20a and the second optical units 20b is disposed between the first substrate 201 and the second substrate 202, and the first optical units 20a and the second optical units 20b are alternately disposed in the thickness direction of the diffraction panel 20.

Specifically, each first optical unit 20a is composed of one optical element 206 and a plurality of liquid crystal molecules 2051 disposed corresponding to the one optical element 206 in the thickness direction of the diffraction panel 20. Each second optical unit 20b is composed of a plurality of liquid crystal molecules 2051. It will be understood that each first optical unit 20a may also consist of a plurality of continuously disposed optical elements 206 and a plurality of liquid crystal molecules 2051, and any two adjacent optical elements 206 of the plurality of continuously disposed optical elements 206 are in contact with each other.

In this embodiment, when the display device 100 is in the first display mode, the long axis of the plurality of liquid crystal molecules 2051 in the first optical units 20a is disposed in the first direction, the refractive index of the plurality of liquid crystal molecules 2051 in the first optical units 20a in the thickness direction of the diffraction panel 20 is the refractive index n3 of the short axis of the plurality of liquid crystal molecules, which is different from the refractive index of the optical elements 206. Each of the long axis of the plurality of liquid crystal molecules 2051 in the second optical units 20b is disposed in the first direction, and the refractive index of the plurality of liquid crystal molecules 2051 in the second optical units 20b in the thickness direction of the diffraction panel 20 is the refractive index n3 of the short axis of the plurality of liquid crystal molecules. Since the refractive index of the plurality of liquid crystal molecules 2051 in the first optical units 20a in the thickness direction of the diffraction panel 20 is different from the refractive index n2 of the optical elements 206, light is reflected when passing through the first optical units 20a, and the plurality of liquid crystal molecules 2051 in the second optical unit 20b are media having a uniform refractive index, so that a transmittance of the first optical units 20a is less than a transmittance of the second optical units 20b.

Wherein, when the display device 100 is in the first display mode, in the first optical units 20a, a transmittance of light incident from the backlight module 10 into the diffraction panel 20 at an interface between the optical elements 206 and the plurality of liquid crystal molecules 2051 is greater than or equal to 0% and less than 100%, so that the transmittance of the light incident from the backlight module 10 into the diffraction panel 20 in the first optical units 20a is greater than or equal to 0% and less than 100%. The lower the transmittance of the light incident on the diffraction panel 20 from the backlight module 10 at the interface between the optical elements 206 and the plurality of liquid crystal molecules 2051, the darker the brightness of light close to a portion of the interface between the optical elements 206 and the plurality of liquid crystal molecules 2051. For example, the transmittance of the light incident from the backlight module 10 into the diffraction panel 20 through the first optical unit 20a may be 0%, 5%, 15%, 20%, 30%, 40%, 50%, 60%, 70%, 80%, 90%. When the display device 100 is in the first display mode, a transmittance of light incident from the backlight module 10 into the diffraction panel 20 through the liquid crystal molecules 2051 at gaps between two adjacent optical elements 206 tends to or be equal to 100%, so that transmittance of light incident from the backlight module 10 into the diffraction panel 20 in the second optical units 20b is close to or equal to 100%, and correspondingly, a brightness of the second optical units 20b is relatively bright.

Specifically, when the display device 100 is in the first display mode, the refractive index of the plurality of liquid crystal molecules 2051 in the first optical units 20a in the thickness direction of the diffraction panel 20 is less than the refractive index of the optical elements 206 in the first optical unit 20a so that light is totally reflected at the interface between the optical elements 206 and the liquid crystal molecules 2051 in the first optical units 20a, further reducing the transmittance of the light incident on the diffraction panel 20a through the first optical units 20a. The long axis of the plurality of liquid crystal molecules 2051 in the second optical unit 20b is arranged in the first direction.

It should be noted that when the display device 100 is in the first display mode, light is incident from the optical elements 206 to the plurality of liquid crystal molecules 2051 disposed along the long axis in the first direction using the plurality of liquid crystal molecules 2051 in the first optical units 20a in the thickness direction of the diffraction panel 20 having a refractive index less than the refractive index n2 of the plurality of optical elements 206, so that light is incident from a light-dense medium to a light-sparse medium so that at least a portion of light incident at the interface between the plurality of liquid crystal molecules 2051 and the plurality of optical elements 206 in the first optical units 20a is totally reflected at the interface. The plurality of liquid crystal molecules 2051 at gaps between two adjacent optical elements 206 have a uniform refractive index, the transmittance of light passing through the plurality of liquid crystal molecules 2051 at the gaps between two adjacent optical elements 206 is close to 100%, so that the brightness close to part of position at the interface between the plurality of optical elements 206 and the plurality of liquid crystal molecules 2051 is lower than the brightness close to part of position between two adjacent optical elements 206 i.e., the brightness near the partial position at the interface between the optical elements 206 and the plurality of liquid crystal molecules 2051 in the first optical units 20a (e.g., A in FIG. 1) is lower than the brightness of the second optical units 20b (e.g., B in FIG. 1), so that bright and dark apertures are alternately arranged in the diffraction panel 20, zero-order diffraction occurs in the normal direction (i.e., a positive viewing angle direction) of a display surface of the diffraction panel 20, and high-order diffraction occurs in a direction (i.e., off-axis direction) away from the normal direction of the display surface of the diffraction panel 20, a light extraction angle in the direction (off-axis direction) away from the normal direction of the display surface of the diffraction panel 20 becomes large, and the high-order diffraction increases a viewing angle in the normal direction away from the display surface of the diffraction panel 20 so as to have a wide viewing angle in the first display mode. The larger the difference between light and dark in the diffraction panel 20, the more obvious the diffraction phenomenon.

In this embodiment, as shown in FIG. 2, when the display device 100 is in the second display mode, the long axis of the plurality of liquid crystal molecules 2051 in the first optical units 20a is disposed in the second direction, the refractive index of the plurality of liquid crystal molecules 2051 in the first optical units 20a in the thickness direction of the diffraction panel 20 is the refractive index n1 of the long axis of the plurality of liquid crystal molecules 2051, and the refractive index of the plurality of liquid crystal molecules 2051 in the first optical unit 20a in the thickness direction of the diffraction panel 20 is the same as the refractive index of the optical elements 206, that is, the refractive index n2 of the optical elements 206 is equal to the refractive index n1 of the long axis of the plurality of liquid crystal molecules 2051. The long axis of the liquid crystal molecules 2051 in the second optical units 20b is disposed in the second direction, and the refractive index of the liquid crystal molecules 2051 in the second optical units 20b in the thickness direction of the diffraction panel 20 is the refractive index n1 of the long axis of the liquid crystal molecules 2051. Therefore, both the refractive index of the first optical units 20a in the thickness direction of the diffraction panel 20 and the refractive index of the second optical units 20b in the thickness direction of the diffraction panel 20 are equal to the refractive index n1 of the liquid crystal molecules 2051 in the long axis, so that the transmittance of the first optical units 20a is equal to the transmittance of the second optical units 20b.

It should be noted that, when the display device 100 is in the second display mode, the refractive index of the first optical units 20a in the thickness direction of the diffraction panel 20 and the refractive index of the second optical units 20b in the thickness direction of the diffraction panel 20 are both equal to the refractive index n1 in the long axis of the liquid crystal molecules 2051, and the light incident from the backlight module 10 to the diffraction panel 20 is transmitted in a medium having the same refractive index without total reflection, and the light emitted from the diffraction panel 20 maintains narrow viewing angle characteristic of the collimated backlight.

In this embodiment, the optical elements 206 comprise optical prisms, and a bottom surface of the optical prism is disposed on the first substrate 201 so that at least a portion of light incident into the optical prism is totally reflected at an interface between inclined surfaces of the optical prism and the plurality of liquid crystal molecules 2051. The optical prism may be a prism cylinder, a prism cone, or other optical prisms.

Wherein a longitudinal cross-sectional pattern of the optical prism is triangular, facilitating total reflection of at least a portion of light incident on the optical elements 206 an interface between the optical elements 206 and the liquid crystal layer 205. An angle of at least one bottom angle of the triangle is $\alpha$, $90°>\alpha\geq\sin^{-1}(n4/n2)$, n4 is a refractive index of the plurality of liquid crystal molecules 2051 in the first optical units 20a in the thickness direction of the diffraction panel when the display device is in the first display mode, and n2 is the refractive index of the optical elements 206, so that the light incident into the optical elements 206 is totally reflected at at least one interface between the optical elements 206 and the plurality of liquid crystal molecules 2051, the transmittance of the light incident into the optical elements 206 at the interface between the optical elements 206 and the plurality of liquid crystal molecules 2051 is reduced, and a corresponding dark place is formed in the diffraction panel 20.

Further, the triangle is an acute triangle such that light incident into the optical elements 206 can be totally reflected at more interfaces between the optical elements 206 and the plurality of liquid crystal molecules 2051.

Specifically, as shown in FIG. 1, the longitudinal cross-sectional surface of the optical prism has an isosceles right-angled triangle, and $\sin^{-1}(n4/n2)\leq 45$, such that the collimated backlight incident on the optical elements 206 is reflected to a side of the backlight module 10 by two total reflections, so that the transmittance of the light incident on the optical elements 206 at the interface between the optical elements 206 and the plurality of liquid crystal molecules 2051 tends to 0%, and the transmittance of the light incident on the gaps between two adjacent optical elements 206 tends to 100%, so that the brightness difference between the light and the dark is maximized, so that the diffraction effect is optimal, and further, the display device 100 has a maximum viewing angle in the first display mode.

Figure 3:
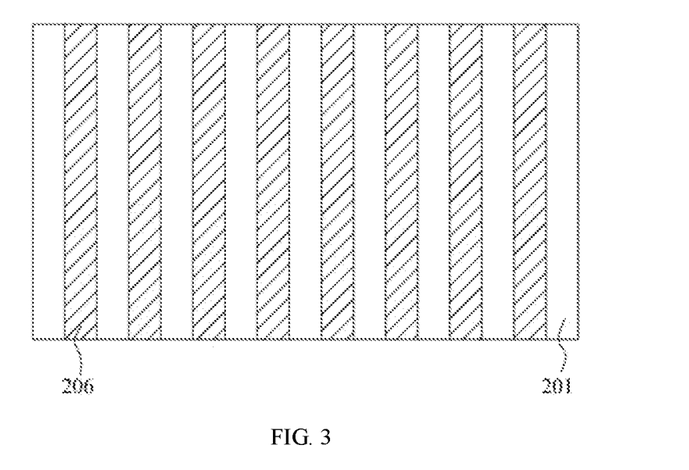
FIG. 3 is a first schematic plan view of a plurality of optical elements shown in FIG. 1 disposed on a first substrate.
Figure 4:
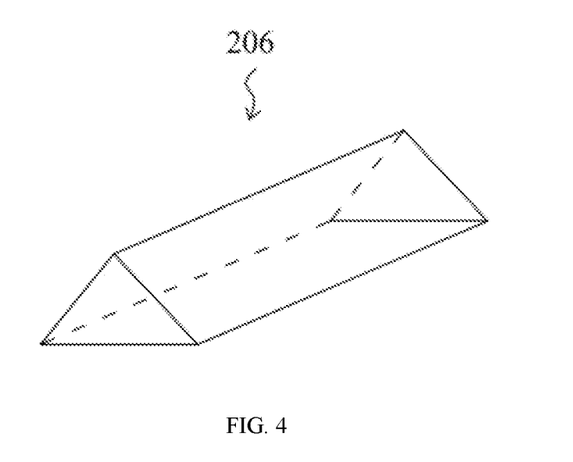
FIG. 4 is a perspective view of the optical element shown in FIG. 3.

In this embodiment, as shown in FIG. 3, when the plurality of optical elements 206 are prism columns, the plurality of optical elements 206 are arranged one-dimensionally on the first substrate 201, that is, in one direction. Specifically, as shown in FIG. 4, the optical elements 206 are triangular prisms, the triangular prisms are elongated, a longitudinal direction of the triangular prism is parallel to a width direction of the first substrate 201, and the plurality of optical elements 206 are arranged on the first substrate 201 at equal intervals in a row direction. It will be appreciated that the plurality of optical elements 206 may also be arranged at equal intervals in a column direction. When the plurality of optical elements 206 are prism columns and arranged one-dimensionally, there is a wide viewing angle in an arrangement direction of the plurality of optical elements 206, for example, in the row direction. Wherein an interval between adjacent two optical elements 206 is 0.05 microns to 5 microns, for example, 0.05 microns, 0.1 microns, 0.15 microns, 0.2 microns, 0.25 microns, 1 micron, 1.5 microns, 2 microns, 4 microns. A size (length or width) of a bottom surface of each optical element 206 is 0.05 microns-5 microns. For example, when the bottom surface is rectangular, a length or width of the rectangle is 0.05 microns, 0.1 microns, 0.15 microns, 0.2 microns, 0.25 microns, 1 micron, 1.5 microns, 2 microns, 4 microns.

Figure 5:
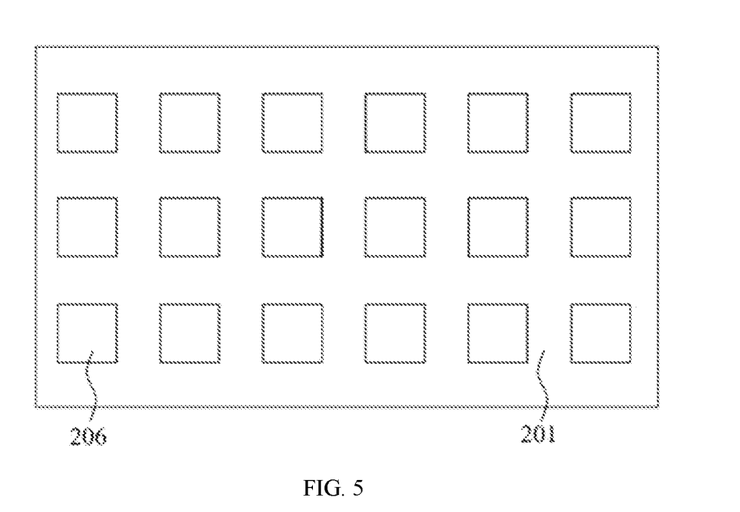
FIG. 5 is a second schematic plan view of a plurality of optical elements shown in FIG. 1 disposed on a first substrate.
Figure 6:
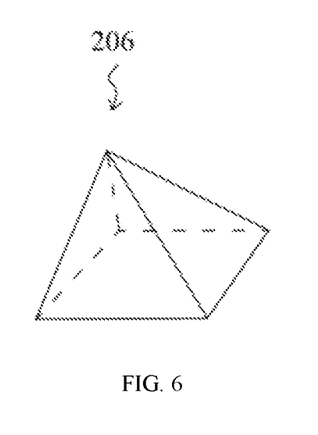
FIG. 6 is a perspective view of the optical element shown in FIG. 5.

When the plurality of optical elements 206 are prism cones, the plurality of optical elements 206 are arranged in a two-dimensional array. Specifically, as shown in FIGS. 5 and 6, the optical elements 206 are quadrangular pyramids, and a plurality of optical elements 206 are arranged on the first substrate at equal intervals in the row direction and the column direction. It will be appreciated that the optical elements 206 may also be triangular pyramids. When the optical elements 206 are triangular pyramids or quadrangular pyramids and are arranged in a two-dimensional array, it has wide viewing angles in both the row direction and the column direction.

Figure 7:
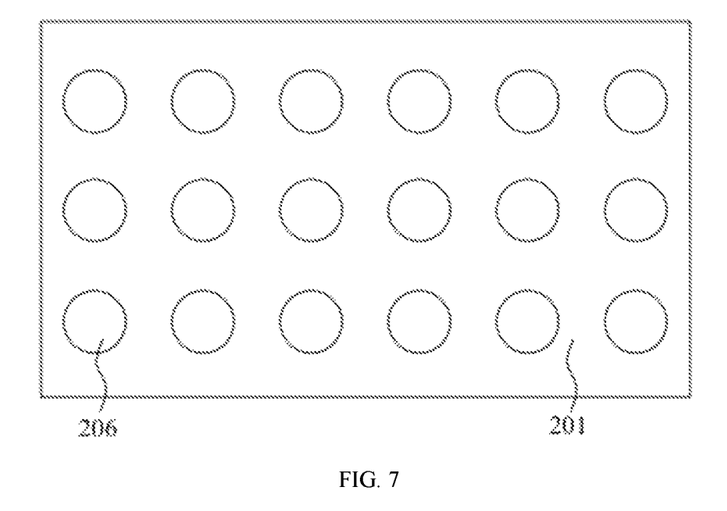
FIG. 7 is a third schematic plan view of a plurality of optical elements shown in FIG. 1 disposed on a first substrate.
Figure 8:
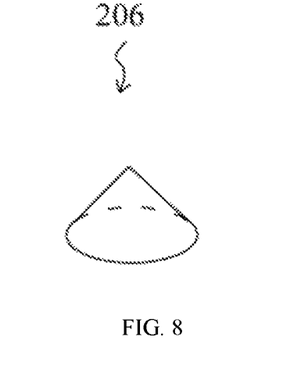
FIG. 8 is a perspective view of the optical element shown in FIG. 7.

As shown in FIGS. 7 and 8, the optical elements 206 are conical, and the plurality of optical elements 206 are arranged on the first substrate 201 at equal intervals in the row direction and the column direction. When the optical elements 206 are conical, the display device 100 has a wide viewing angle in all directions.

In this embodiment, when the display device 100 is in the first display mode, the dimming panel 30 is in a first state (scattering state), and the dimming panel 30 in the first state scatters the light emitted by the diffraction panel 20 so that dispersion occurring in the off-axis direction due to the diffraction of the diffraction panel 20 is improved. When the display device 100 is in the second display mode, the dimming panel 30 is in a second state which is a light transmitting state, so that the collimated backlight emitted from the diffraction panel passes through the dimming panel 30, the narrow viewing angle characteristic of the collimated backlight is maintained, and the loss of light is reduced.

Figure 9:
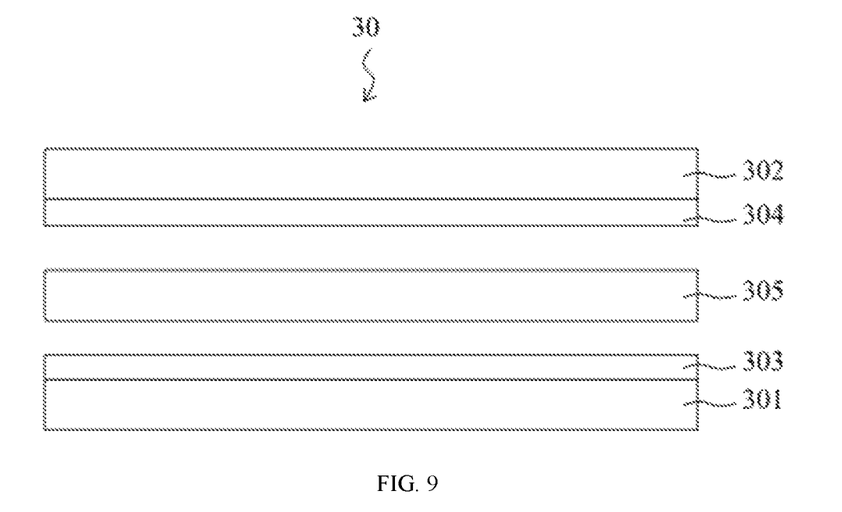
FIG. 9 is a schematic view of a dimming panel shown in FIG. 1.

Specifically, as shown in FIG. 9, the dimming panel 30 comprises a third substrate 301, a fourth substrate 302, a third electrode layer 303, a fourth electrode layer 304, and a dimming layer 305, the third substrate 301 is disposed opposite to the fourth substrate 302, the third substrate 301 is disposed close to the diffraction panel 20, the fourth substrate 302 is disposed away from the diffraction panel 20, the third electrode layer 303 is disposed on a surface of the third substrate 301 close to the fourth substrate 302, the fourth electrode layer 304 is disposed on a surface of the fourth substrate 302 close to the third substrate 301, and the dimming layer 305 is disposed between the third electrode layer 303 and the fourth electrode layer 304, and the dimming layer 305 comprises polymer dispersed liquid crystals, polymer network liquid crystals, a focal-conic state of biliary phase liquid crystals, or other electrohaze controllable material. The dimming panel 30 is switched between the first state and the second state by controlling voltage difference between the third electrode layer 303 and the fourth electrode layer 304. Each of the third electrode layer 303 and the fourth electrode layer 304 is a transparent electrode layer.

It should be noted that, when light diffracts, diffraction angles of the light having different wavelengths incident on the diffraction panel 20 from the backlight module 10 do not coincide, that is, dispersion usually occurs. The dispersion causes the light having different colors to be spatially separated in the higher order diffraction poles, resulting in rainbow patterns on the off-axis display screen in a mode of wide viewing angle. To eliminate the dispersion, an electrohaze-adjustable dimmer panel 30 may be disposed above the diffraction panel 20. The light of different wavelengths separated due to diffraction dispersion is scattered by the dimming panel 30 and re-fused in space to form white light, reducing the rainbow pattern of off-axis viewing angle.

Figure 10:
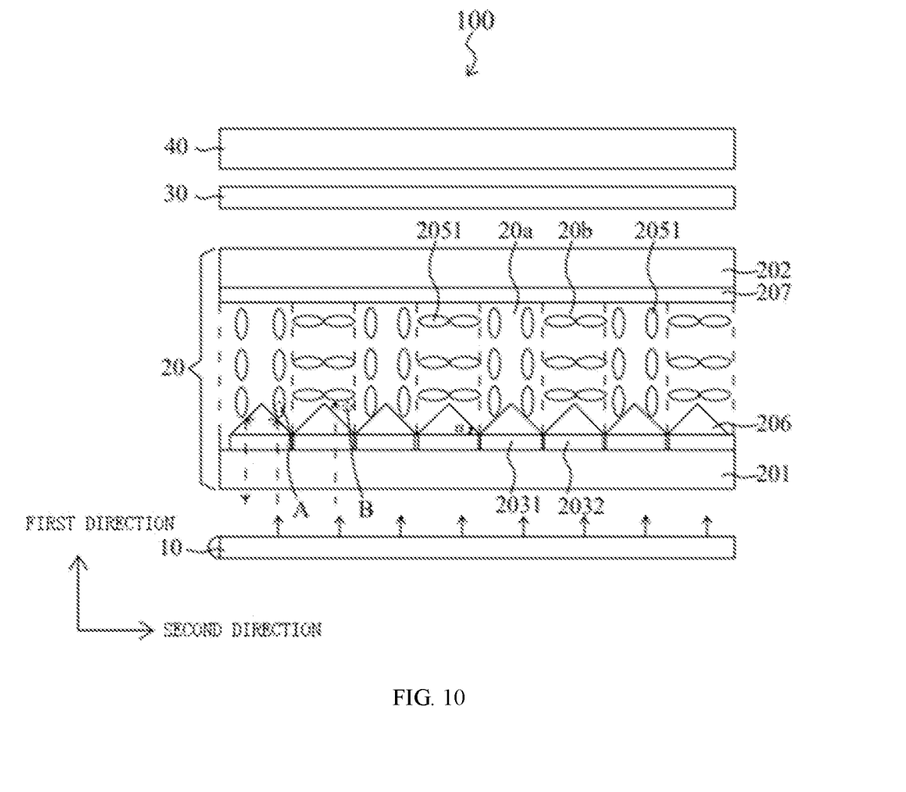
FIG. 10 is a schematic diagram of a display device in a first display mode according to a second embodiment of the present disclosure.
Figure 11:
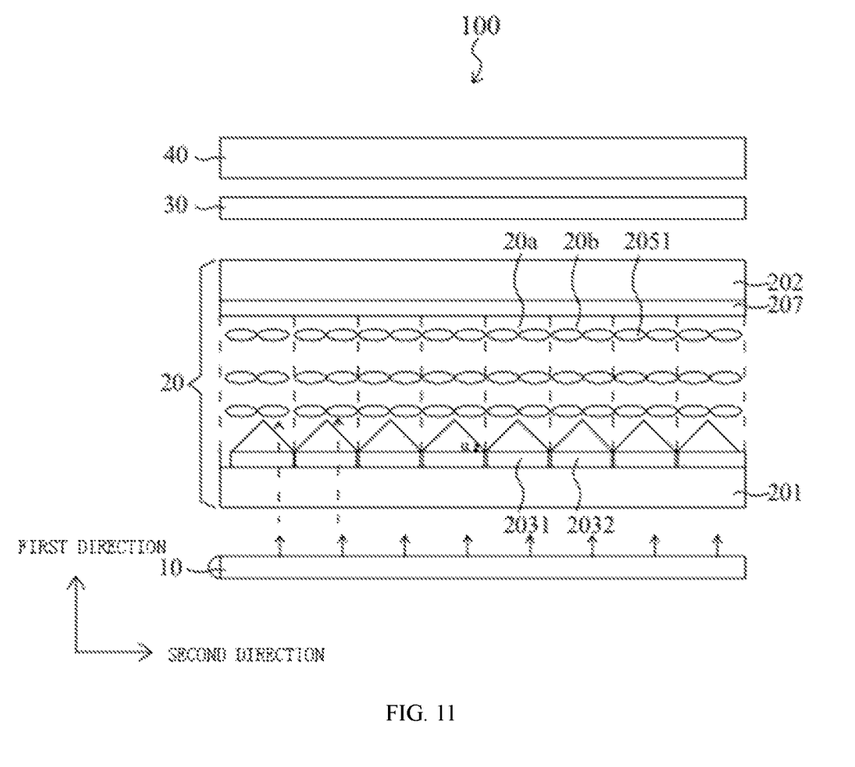
FIG. 11 is a schematic diagram of a display device in a second display mode according to a second embodiment of the present disclosure.

Referring to FIGS. 10 and 11, FIG. 10 is a schematic diagram of a display device in a first display mode according to a second embodiment of the present disclosure, and FIG. 11 is a schematic diagram of a display device in a second display mode according to the second embodiment of the present disclosure. The display device shown in FIG. 10 is similar to the display device shown in FIG. 1, differences lie in that: the first optical unit 20a comprises a plurality of liquid crystal molecules 2051 and at least one optical element 206, the second optical unit 20b comprises a plurality of liquid crystal molecules 2051 and at least one optical element 206; the diffraction panel 20 further comprises third electrodes 2031, fourth electrodes 2032, and a fifth electrode layer 207, the third electrodes 2031 are disposed on a surface of the first substrate 201 close to the second substrate 202 and corresponding to the first optical units 20a, the fourth electrodes 2032 are disposed on a surface of the first substrate 201 close to the second substrate 202 and corresponding to the second optical units 20b, the fourth electrodes 2032 are disposed on a same layer as the third electrodes 2031, the fourth electrodes 2032 and adjacent third electrodes are disconnected, and the fifth electrode layer 207 is disposed on a surface of the second substrate 202 close to the first substrate 201. The fourth electrodes 2032, the third electrodes 2031, and the fifth electrode layer 207 are transparent electrodes.

Figure 12:
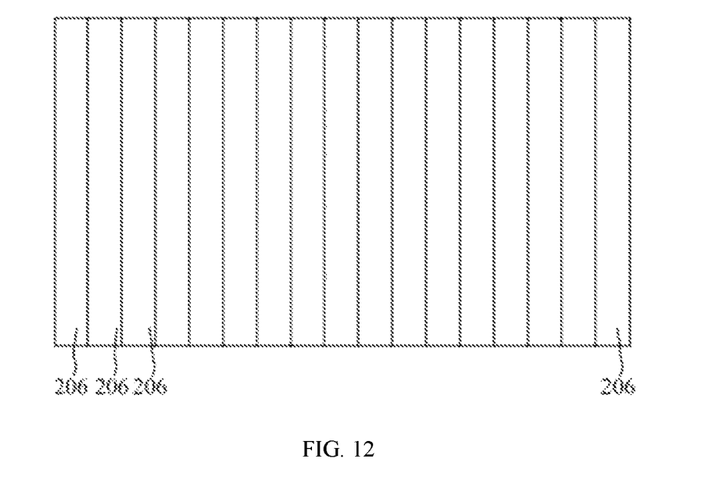
FIG. 12 is a schematic plan view of a plurality of optical elements shown in FIG. 10 disposed on a first substrate.

The number of the optical elements 206 in the first optical unit 20a may be one or multiple. When the number of the optical elements 206 in the first optical unit 20a is multiple, the plurality of the optical elements 206 in the first optical unit 20a are continuously disposed and any two adjacent optical elements 206 are in contact with each other without exposing a gap of the first substrate 201. The number of the optical elements 206 in the second optical unit 20b may be one or multiple. When the number of the optical elements 206 in the second optical unit 20b is multiple, the plurality of the optical elements 206 in the second optical unit 20b are continuously disposed and any two adjacent optical elements 206 are in contact with each other without exposing a gap of the first substrate 201. The at least one optical element 206 in the first optical unit 20a and the at least one optical element 206 in the second optical unit 20b are disposed continuously, that is, the plurality of optical elements 206 are disposed on the first substrate 201 as a whole, as shown in FIG. 12. An arrangement and structure of the optical elements 206 may be the same as that of the optical elements 206 in the first embodiment, and will not be described in detail herein.

When the display device 100 is in the first display mode, the long axis of the plurality of liquid crystal molecules 2051 in the first optical units 20a is disposed in the first direction, the refractive index of the plurality of liquid crystal molecules 2051 in the first optical units 20a in the thickness direction of the diffraction panel 20 is different from the refractive index of the optical elements 206 in the first optical units 20a, the long axis of the plurality of liquid crystal molecules 2051 in the second optical units 20b is disposed in the second direction, the refractive index of the plurality of liquid crystal molecules 2051 in the second optical units 20b in the thickness direction of the diffraction panel 20 is the same as the refractive index of the optical elements 206 in the second optical units 20b so that the transmittance of the first optical units 20a is smaller than the transmittance of the second optical units 20b, the collimated backlight entering the diffraction panel 20 from the backlight module 20a is diffracted after passing through the diffraction panel 20, and the diffracted light is improved after passing through the dimming panel 30, and after the light emitted from the dimming panel 30 is incident on the display panel 40, the visual viewing angle of the display panel 40 increases.

When the display device 100 is in the second display mode, both the long axis of the plurality of liquid crystal molecules 2051 in the first optical units 20a and the long axis of the plurality of liquid crystal molecules 2051 in the second optical units 20b are disposed in the second direction, and the refractive index of the plurality of liquid crystal molecules 2051 in the first optical units 20a in the thickness direction of the diffraction panel 20 is the same as the refractive index of the optical elements 206 in the first optical units 20a, and the refractive index of the plurality of liquid crystal molecules 2051 in the second optical units 20b in the thickness direction of the diffraction panel 20 is the same as the refractive index of the optical elements 206 in the second optical units 20b, so that the transmittance of the first optical units 20a is equal to the transmittance of the second optical units 20b, and the narrow viewing angle characteristic of the collimated backlight is maintained after the collimated backlight in the diffraction panel 20 enters from the backlight module 10a through the diffraction panel 20, the light emitted from the diffraction panel 20 continues to pass through the dimming panel 30 and the display panel 40, and continuing to maintain the narrow viewing angle characteristics of the collimated backlight.

In this embodiment, the third electrodes 2031 and the fifth electrode layer 207 are configured to apply a voltage to the plurality of liquid crystal molecules 2051 in the first optical units 20a so that the long axis L of the plurality of liquid crystal molecules 2051 in the first optical units 20a is switched between being disposed in the first direction and being disposed in the second direction. The fourth electrodes 2032 and the fifth electrode layer 207 are configured to apply a voltage to the plurality of liquid crystal molecules 2051 in the second optical units 20b so that the long axis of the plurality of liquid crystal molecules 2051 in the second optical units 20b is disposed in the second direction.

Specifically, when the display device 100 is in the first display mode, a voltage difference between the third electrodes 2031 and the fifth electrode layer 207 is less than a second preset threshold value so that the long axis of the plurality of liquid crystal molecules 2051 in the first optical units 20a is disposed in the first direction. A voltage difference between the fourth electrodes 2032 and the fifth electrode layer 207 is greater than the second preset threshold value so that the long axis of the plurality of liquid crystal molecules 2051 in the second optical units 20b is disposed in the second direction.

When the display device 100 is in the second display mode, the voltage difference between the third electrode 2031 and the fifth electrode layer 207 is equal to the voltage difference between the fourth electrodes 2032 and the fifth electrode layer 207, and the voltage difference between the fourth electrodes 2032 and the fifth electrode layer 207 is greater than the second preset threshold value, the long axis of the plurality of liquid crystal molecules 2051 in the first optical units 20a and the long axis of the plurality of liquid crystal molecules 2051 in the second optical units 20b are both disposed in the second direction.

The display device of this embodiment is different from the display device of the first embodiment in that the plurality of optical elements are disposed on the first substrate as a whole, and the disconnected third and fourth electrodes are respectively controlled so that when the display device is in the first display mode, the direction of the long axis of the liquid crystal molecules in the first optical units is different from the direction of the long axis of the liquid crystal molecules in the second optical units, the refractive index of the liquid crystal molecules in the first optical units in the thickness direction of the diffraction panel is different from the refractive index of the liquid crystal molecules in the second optical units in the thickness direction of the diffraction panel, the refractive index of the liquid crystal molecules in the second optical unit in the thickness direction of the diffraction panel is the same as the refractive index of the optical elements, and the refractive index of the liquid crystal molecules in the first optical unit in the thickness direction of the diffraction panel is different from the refractive index of the optical elements, so that the transmittance of the first optical units 20a is less than the transmittance of the second optical units 20b.

According to the foregoing, the present disclosure provides a novel dynamic peep-proof display device. When the display device is in the second display mode, the display device uses the narrow viewing angle characteristic of collimated backlight provided by the backlight module, and the refractive index of the liquid crystal layer in the thickness direction of the diffraction panel is equal to the refractive index of the plurality of optical elements, the collimated backlight passes through a medium having a uniform refractive index in the diffraction panel without total reflection, the light emitted from the diffraction panel maintains the narrow viewing angle characteristics of the collimated backlight, and the light emitted from the diffraction panel passes through the dimming panel and the display panel in the second state (transparent state), so that the light emitted from the display panel still maintains the narrow viewing angle characteristics of the collimated backlight, so that the display device can realize the narrow viewing angle display in the second display mode. When the display device is in the first display mode, after the collimated backlight emitted by the backlight module is incident on the diffraction panel, a part of the light is incident on the first optical units, a part of the light is incident on the second optical units, the transmittance of the first optical units is less than the transmittance of the second optical units, the first optical units and the second optical units are alternately arranged so that the brightness in the diffraction panel is periodically distributed alternately, and then different diffraction poles appear, the different diffraction poles have different diffraction angles, the 0-order diffraction corresponds to the display of the forward viewing angle, and the higher-order diffraction corresponds to the display of the off-axis viewing angle, so that the off-axis direction has a wide viewing angle, the dimming panel in the first state scatters the diffracted light emitted by the diffraction panel, so that the spatially separated different diffracted light is scattered and fused, the white light output is re-formed, the dispersion is reduced, and the display device is displayed in a wide viewing angle in the first display mode, and a good display effect in the off-axis direction is ensured. Further, the display device realizes dynamic switching between the first display mode and the second display mode by controlling the voltage applied to the liquid crystal layer and the voltage applied to the dimming layer in the diffraction panel.

The description of the above embodiments is merely intended to help understand the technical solutions of the present disclosure and the core ideas thereof. Those of ordinary skill in the art will appreciate that they may still modify the technical solutions described in the foregoing embodiments, or equivalently replace some of the technical features therein. These modifications or substitutions do not deviate the nature of the respective solutions from the scope of the solutions of the embodiments of the present disclosure.

What is claimed is:

1. A display device, wherein the display device comprises a diffraction panel and a display panel, wherein the diffraction panel is located on a light incident side of the display panel, and the diffraction panel comprises:
    a first substrate;
    a second substrate disposed opposite to the first substrate;
    a plurality of first optical units disposed between the first substrate and the second substrate; and
    a plurality of second optical units disposed between the first substrate and the second substrate and disposed alternately with the plurality of first optical units in a direction perpendicular to a thickness direction of the diffraction panel;
    wherein a transmittance of the first optical units to light is less than a transmittance of the second optical units to light when the display device is in a first display mode, and
    when the display device is in a second display mode, the transmittance of the first optical units to light is equal to the transmittance of the second optical units to light, and a visual viewing angle in second display mode is less than a visual viewing angle in the first display mode;
    wherein the first optical units comprise a plurality of liquid crystal molecules and optical elements, and the second optical units comprise a plurality of the liquid crystal molecules,
        when the display device is in the first display mode, a long axis of the plurality of the liquid crystal molecules in the first optical units is disposed in a first direction, and a refractive index of the plurality of liquid crystal molecules in the first optical units in the thickness direction of the diffraction panel is different from a refractive index of the optical elements, and a long axis of the plurality of liquid crystal molecules in the second optical units is disposed in the first direction, or each of the first optical units comprises a plurality of liquid crystal molecules and at least one optical element, and each of the second optical units comprises a plurality of liquid crystal molecules and at least one optical element, when the display device is in the first display mode, a long axis of the plurality of liquid crystal molecules in the first optical units is disposed in a first direction, a refractive index of the plurality of liquid crystal molecules in the first optical units in the thickness direction of the diffraction panel is different from a refractive index of the optical elements in the first optical units, a long axis of the plurality of liquid crystal molecules in the second optical units is disposed in a second direction, a refractive index of the plurality of liquid crystal molecules in the second optical units in the thickness direction of the diffraction panel is same as a refractive index of the optical elements in the second optical units, and the second direction is different from the first direction.

2. The display device according to claim 1, wherein when the first optical units comprise the plurality of liquid crystal molecules and optical elements, and the second optical units comprise the plurality of the liquid crystal molecules, when the display device is in the second display mode, the long axis of the plurality of liquid crystal molecules in the first optical units is disposed in a second direction, and the refractive index of the plurality of liquid crystal molecules in the first optical units in the thickness direction of the diffraction panel is same as the refractive index of the optical elements, and the long axis of the plurality of liquid crystal molecules in the second optical units is disposed in the second direction, and the second direction is different from the first direction.

3. The display device according to claim 2, wherein the diffraction panel further comprises:
a first electrode layer disposed on a surface of the first substrate close to the second substrate; and
a second electrode layer disposed on a surface of the second substrate close to the first substrate;
the first electrode layer and the second electrode layer are configured to load voltages to the plurality of liquid crystal molecules in the first optical units and the plurality of liquid crystal molecules in the second optical units such that long axes of the plurality of liquid crystal molecules in the first optical units and the second optical units are switched between being disposed in the first direction and being disposed in the second direction.

4. The display device according to claim 2, wherein the optical elements are disposed on the first substrate, and the first substrate is located on a side of the second substrate away from the display panel;
the first direction is the thickness direction of the diffraction panel, and the second direction is perpendicular to the thickness direction of the diffraction panel; and
when the display device is in the first display mode, the refractive index of the plurality of liquid crystal molecules in the first optical units in the thickness direction of the diffraction panel is less than the refractive index of the optical elements in the first optical units.

5. The display device according to claim 4, wherein the optical elements comprise optical prisms.

6. The display device according to claim 5, wherein when the display device is in the first display mode, the refractive index of the plurality of liquid crystal molecules in the first optical units in the thickness direction of the diffraction panel is n1, and the refractive index of the optical elements is n2; and
a bottom surface of each of the optical prisms is located on the first substrate, a longitudinal cross-section of each of the optical prisms corresponds to a pattern of a triangle, and at least one bottom angle of the triangle has an angle $\alpha$, $90°>\alpha \geq \sin^{-1}(n1/n2)$.

7. The display device according to claim 5, wherein a longitudinal cross-sectional pattern of each of the optical prisms is an isosceles right triangle.

8. The display device according to claim 4, wherein the plurality of optical elements are arranged one-dimensionally on the first substrate.

9. The display device according to claim 8, wherein the optical elements comprise prism columns.

10. The display device according to claim 4, wherein the plurality of optical elements are arranged in a two-dimensional array on the first substrate.

11. The display device according to claim 10, wherein the optical elements comprise prism cones comprising any one of triangular pyramids, quadrangular pyramids, or cones.

12. The display device according to claim 1, wherein when each of the first optical units comprises the plurality of liquid crystal molecules and at least one optical element, and each of the second optical units comprises the plurality of liquid crystal molecules and at least one optical element, when the display device is in the second display mode, both the long axis of the plurality of liquid crystal molecules in the first optical units and the long axis of the plurality of liquid crystal molecules in the second optical units are disposed in the second direction, and the refractive index of the plurality of liquid crystal molecules in the first optical units in the thickness direction of the diffraction panel is same as the refractive index of the optical elements in the first optical units, and the refractive index of the plurality of liquid crystal molecules in the second optical units in the thickness direction of the diffraction panel is same as the refractive index of the optical elements in the second optical units.

13. The display device according to claim 12, wherein the diffraction panel further comprises:
third electrodes disposed on a surface of the first substrate close to the second substrate and corresponding to the first optical units;
fourth electrodes disposed on a surface of the first substrate close to the second substrate and corresponding to the second optical units; and
a fifth electrode layer disposed on a surface of the second substrate close to the first substrate;
wherein the third electrodes and the fifth electrode layer are configured to apply a voltage to the plurality of liquid crystal molecules in the first optical units so that the long axis of the plurality of liquid crystal molecules in the first optical units is switched between being disposed in the first direction and being disposed in the second direction; and
the fourth electrodes and the fifth electrode layer are configured to apply a voltage to the plurality of liquid crystal molecules in the second optical units so that the long axis of the plurality of liquid crystal molecules in the second optical units is disposed in the second direction.

14. The display device according to claim 1, wherein the display device further comprises:
- a dimming panel disposed between the diffraction panel and the display panel;
- wherein when the display device is in the first display mode, the dimming panel is in a first state, and the dimming panel in the first state scatters light emitted from the diffraction panel; and
- when the display device is in the second display mode, the dimming panel is in a second state, and the second state is a transparent state.

15. The display device according to claim 1, wherein the display device further comprises:
- a backlight module for providing collimated backlight on a side of the diffraction panel away from the display panel.

16. A display device, wherein the display device comprises a diffraction panel and a display panel, wherein the diffraction panel is located on a light incident side of the display panel, and the diffraction panel comprises:
- a first substrate;
- a second substrate disposed opposite to the first substrate;
- a plurality of first optical units disposed between the first substrate and the second substrate; and
- a plurality of second optical units disposed between the first substrate and the second substrate and disposed alternately with the plurality of first optical units in a direction perpendicular to a thickness direction of the diffraction panel;
- wherein a transmittance of the first optical units to light is less than a transmittance of the second optical units to light when the display device is in a first display mode, and
- when the display device is in a second display mode, the transmittance of the first optical units to light is equal to the transmittance of the second optical units to light, and a visual viewing angle in second display mode is less than a visual viewing angle in the first display mode;
- wherein each of the first optical units comprises a plurality of liquid crystal molecules and at least one optical element, and each of the second optical units comprises a plurality of liquid crystal molecules and at least one optical element;
- when the display device is in the first display mode, a long axis of the plurality of liquid crystal molecules in the first optical units is disposed in a first direction, a refractive index of the plurality of liquid crystal molecules in the first optical units in the thickness direction of the diffraction panel is different from a refractive index of the optical elements in the first optical units, a long axis of the plurality of liquid crystal molecules in the second optical units is disposed in a second direction, a refractive index of the plurality of liquid crystal molecules in the second optical units in the thickness direction of the diffraction panel is same as a refractive index of the optical elements in the second optical units, and the second direction is different from the first direction; and
- when the display device is in the second display mode, both the long axis of the plurality of liquid crystal molecules in the first optical units and the long axis of the plurality of liquid crystal molecules in the second optical units are disposed in the second direction, and the refractive index of the plurality of liquid crystal molecules in the first optical units in the thickness direction of the diffraction panel is same as the refractive index of the optical elements in the first optical units, and the refractive index of the plurality of liquid crystal molecules in the second optical units in the thickness direction of the diffraction panel is same as the refractive index of the optical elements in the second optical units.

17. A display device, wherein the display device comprises a diffraction panel, a display panel, and a dimming panel disposed between the diffraction panel and the display panel, wherein the diffraction panel is located on a light incident side of the display panel, and the diffraction panel comprises:
- a first substrate;
- a second substrate disposed opposite to the first substrate;
- a plurality of first optical units disposed between the first substrate and the second substrate; and
- a plurality of second optical units disposed between the first substrate and the second substrate and disposed alternately with the plurality of first optical units in a direction perpendicular to a thickness direction of the diffraction panel;
- wherein a transmittance of the first optical units to light is less than a transmittance of the second optical units to light when the display device is in a first display mode, and
- when the display device is in a second display mode, the transmittance of the first optical units to light is equal to the transmittance of the second optical units to light, and a visual viewing angle in second display mode is less than a visual viewing angle in the first display mode;
- wherein when the display device is in the first display mode, the dimming panel is in a first state, and the dimming panel in the first state scatters light emitted from the diffraction panel, and
- when the display device is in the second display mode, the dimming panel is in a second state, and the second state is a transparent state.

* * * * *